United States Patent
Wang et al.

(10) Patent No.: US 9,509,974 B2
(45) Date of Patent: Nov. 29, 2016

(54) METHOD AND SYSTEM FOR PROVIDING THREE DIMENSIONAL STEREO IMAGE

(75) Inventors: Guo-Tzau Wang, Hsin Chu (TW);
Ann-Shyn Chiang, Hsin Chu (TW);
Hsiu-Ming Chang, Hsin Chu (TW);
Chao-Chun Chuang, Hsinchu (KR);
Chang-Wei Yeh, Hsinchu (TW);
Chang-Huain Hsieh, Hsinchu (TW)

(73) Assignees: National Tsing Hua University, Hsin Chu (TW); National Applied Research Laboratory, Taipei (TW)

( * ) Notice: Subject to any disclaimer, the term of this patent is extended or adjusted under 35 U.S.C. 154(b) by 543 days.

(21) Appl. No.: 12/871,935

(22) Filed: Aug. 31, 2010

(65) Prior Publication Data

US 2011/0249094 A1    Oct. 13, 2011

(30) Foreign Application Priority Data

Apr. 13, 2010   (TW) ................ 99111509 A (51) Int. Cl.
*H04N 13/02* (2006.01)
*H04N 13/00* (2006.01)
*H04N 13/04* (2006.01)
*H04N 19/597* (2014.01)

(52) U.S. Cl.
CPC ...... *H04N 13/0059* (2013.01); *H04N 13/0296* (2013.01); *H04N 13/0497* (2013.01); *H04N 19/597* (2014.11)

(58) Field of Classification Search
CPC .. G06T 15/00; G06T 15/005; G06T 2200/16; H04N 13/0059
USPC ........................................... 348/46–60
See application file for complete search history.

(56) References Cited

U.S. PATENT DOCUMENTS

| | | | |
|---|---|---|---|
| 2004/0109197 A1* | 6/2004 | Gardaz et al. | 358/1.15 |
| 2005/0062678 A1* | 3/2005 | Mark et al. | 345/2.1 |
| 2005/0080330 A1* | 4/2005 | Masuzawa et al. | 600/407 |
| 2005/0281411 A1* | 12/2005 | Vesely et al. | 381/61 |
| 2009/0207167 A1* | 8/2009 | Pasetto | 345/419 |

* cited by examiner

*Primary Examiner* — Frederick Bailey
*Assistant Examiner* — Farhan Mahmud
(74) *Attorney, Agent, or Firm* — Chih Feng Yeh; Huntington IP Consulting Co., Ltd.

(57) ABSTRACT

The present invention provides a method for providing 3D stereo image. The method comprises: accepting a request submitted from a client system by an intermediate server system; selecting an image server based on the request and responding to the client system from the image server through a processor in the intermediate server system; requesting at least one 3D stereo image by the client system from the image server according to the response; and providing the at least one 3D stereo image to the client system by the image server system. The present invention also provides a system for providing 3D stereo image.

18 Claims, 10 Drawing Sheets

METHOD AND SYSTEM FOR PROVIDING THREE DIMENSIONAL STEREO IMAGE

CROSS-REFERENCE TO RELATED APPLICATION

This present application claims priority to TAIWAN Patent Application Serial Number 099111509, filed Apr. 13, 2010, which is herein incorporated by reference.

TECHNICAL FIELD

The present invention is generally related to the field of the network and, more specifically, to a method and system for providing three-dimensional (3D) stereo image through the network.

DESCRIPTION OF THE RELATED ART

During the year 2009 to 2010, the 3D stereo movie "Avatar" directed by James Cameron was a blockbuster around the world. The enthusiasm to the 3D stereo movie in the public is arisen. In addition to movies, many electronic manufacturers announced that they are going to provide household 3D stereo displays soon. It may be anticipated that users may enjoy 3D stereo images/movies not only in the movie theaters but also at her/his home in the near future.

In some prior arts, the 3D stereo image may be provided in several modes based on the type of displaying apparatus. For example, it may be provided in the active mode, the passive mode, or the anaglyph mode. For active mode, two images (left and right viewpoints) are alternately displayed in a screen. The user may wear shutter glasses to see the specific left or right viewpoints with time division way, for generating the effect as watching 3D stereo images. For the passive mode, the 3D stereo image may be provided by the filters separating the left/right images to either eye. For the anaglyph mode, the 3D stereo image may be provided from the colorized left/right images. They can be chosen by the user according to her/his budget and/or preference. Furthermore, in another prior art, a displaying apparatus can generate integral photography by superimposing the multiple-viewpoint images or other implementation ways, such that the 3D stereo image can be watched with naked eyes.

It should be noted that whatever great 3D stereo display apparatus will become invalid without suitable 3D stereo image source. However, no secure 3D stereo image provider was mentioned in the prior art. Further, in the prior art, users can not interact with the 3D image provider, and the application, such as the application in teaching and medical, of the 3D stereo image is greatly reduced.

Therefore, the present invention provides a method and a system for providing 3D stereo image interactively to overcome the above-mentioned shortcomings and to provide unexpected results comparing to the prior art.

SUMMARY

One purpose of the present invention is to provide a method for providing 3D stereo image, for utilizing an image server system to provide 3D stereo image to a client system through the network.

Another purpose of the present invention is to provide a method for providing 3D stereo image, for utilizing multiple image server systems to provide 3D stereo image to multiple client systems through the network.

Another purpose of the present invention is to provide a method for providing 3D stereo image, for providing an intermediate server system between multiple image server systems and multiple client systems. Thereby, the client system may acquire the 3D stereo image only if the client system is authorized with the key from the intermediate system, for improving the system security of the image server system(s). Further, upon the management of the intermediate server system, one of the multiple image server systems may be chosen to provide service, for providing load balancing and not concentrating multiple client systems on a specific image server system to prevent overloading. Furthermore, when some of the image server systems are out of service, they may be backed up by other image server systems.

Another purpose of the present invention is to provide a method for providing 3D stereo image, for providing a user interface for user(s) to give interaction commands through the transmission system (such as the network) for controlling the 3D stereo image to follow instructions, such as rotating, zooming in/out, moving, adding/deleting items, or other manipulations. The method may enhance the application potential of the 3D stereo image in the teaching, medical, or other fields.

Another purpose of the present invention is to provide a method for providing 3D stereo image, for providing a mobile storage medium which comprises an executable computer program product for constructing an environment of the client system. When connecting the mobile storage medium to a general purpose computer, the environment and configuration for the client system may be structured automatically or semi-automatically. The product facilitates the transformation of a general purpose computer into the client system.

Another purpose of the present invention is to provide a method for providing 3D stereo image, for implementing procedures of fetching, encoding/compressing, and packetizing of multiple viewpoints of an image in the image server system into a single packet for sending, and implementing procedures of packet reassembling and decoding/decompressing for transforming the packet back to the original multiple viewpoints of the image in the client system. Thereby, the nonsynchronicity problem of image caused by narrow network bandwidth or other factors may be amended. Further, because data transferred to the client system(s) are plotted image data, not original data, it improves the security problem of data leakage. In some preferred embodiments, an image division module is utilized to divide the image into a plurality of segmented images. The segments may be transferred to the client system separately or together and be displayed in one or multiple synchronized 3D stereo display. In some preferred embodiments, the data required to be transferred is reduced by implementing the procedures of fetching, encoding/compressing and packetizing the varied portion (segment) of the image specifically.

In one aspect of the present invention, a method for providing 3D stereo image is provided. The method comprises: accepting a request submitted from a client system by an intermediate server system; selecting an image server system based on the request and responding to the client system regarding the image server through a processor in the intermediate system; requesting at least one three-dimensional stereo image by the client system from the image server system according to the response; and providing the at least one three-dimensional stereo image to the client system by the image server system.

In another one aspect of the present invention, a method for providing 3D stereo image is provided. The method comprises: accepting a request submitted from a client system by an intermediate server system; selecting an image server system based on the request and responding to the client system regarding the image server system through a processor in the intermediate system; requesting at least one three-dimensional stereo image by the client system from the image server system according to the response; providing user interface information and the at least one three-dimensional stereo image to the client system by the image server system; directing interaction information to the image server system from the client system; and updating the three-dimensional stereo image, the response to the interaction information, or the combinations thereof according to the interaction information by the image server system.

By referring the following description and illustration of the embodiments of the present invention and the accompanying figures, the advantages and the spirit of the present invention can be better understood.

DETAILED DESCRIPTION

Figure 1:
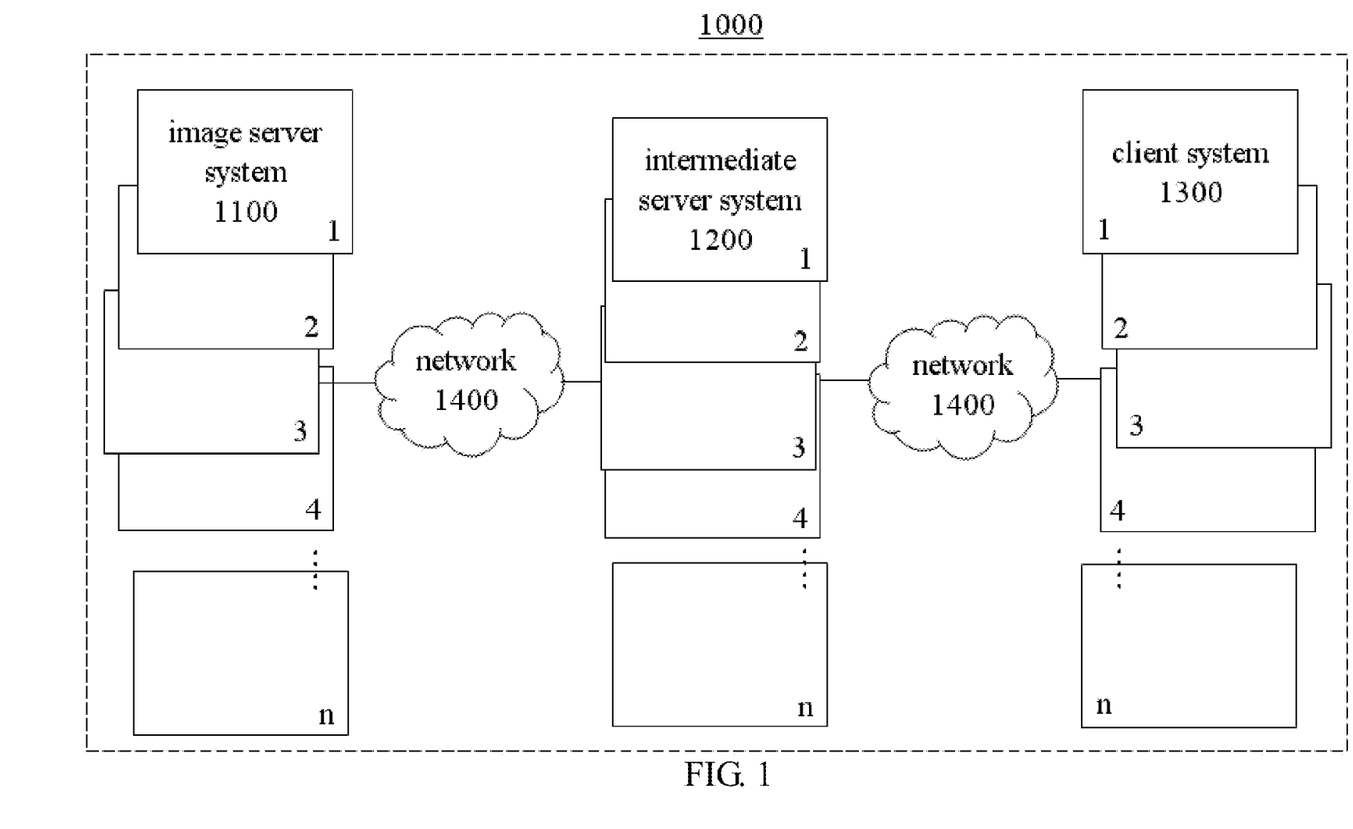
FIG. 1 illustrates the system for providing 3D stereo image according to the embodiments of the present invention.

In some embodiments of the present invention, a system 1000 for providing 3D stereo image (or referred as "multiple-viewpoint image") and the method of the same are provided, as shown in FIG. 1. In FIG. 1, the system 1000 for providing 3D stereo image comprises at least one image server system 1100, at least one intermediate system 1200, and at least one client system 1300. In preferred embodiments, a plurality of image server system 1100, a plurality of intermediate system 1200, and a plurality of client system 1300 are provided. The client system 1300 may be coupled to the image server system 1100 and the intermediate server system 1200 via the network 1400. The network 1400 may comprise the internet, the local area network (LAN), the virtual private network (VPN), or other forms of networks. The transmission system (transmission medium) may comprise wired and/or wireless network apparatuses, or can be implemented by, such as, TV cable, telephone cable, or other medium for transmitting signals. In preferred embodiments, the image server system 1100 and the intermediate server system 1200 may be connected via network file system (NFS), network neighborhood system, or others. The network between them may also comprise LAN, VPN, or others.

Figure 2:
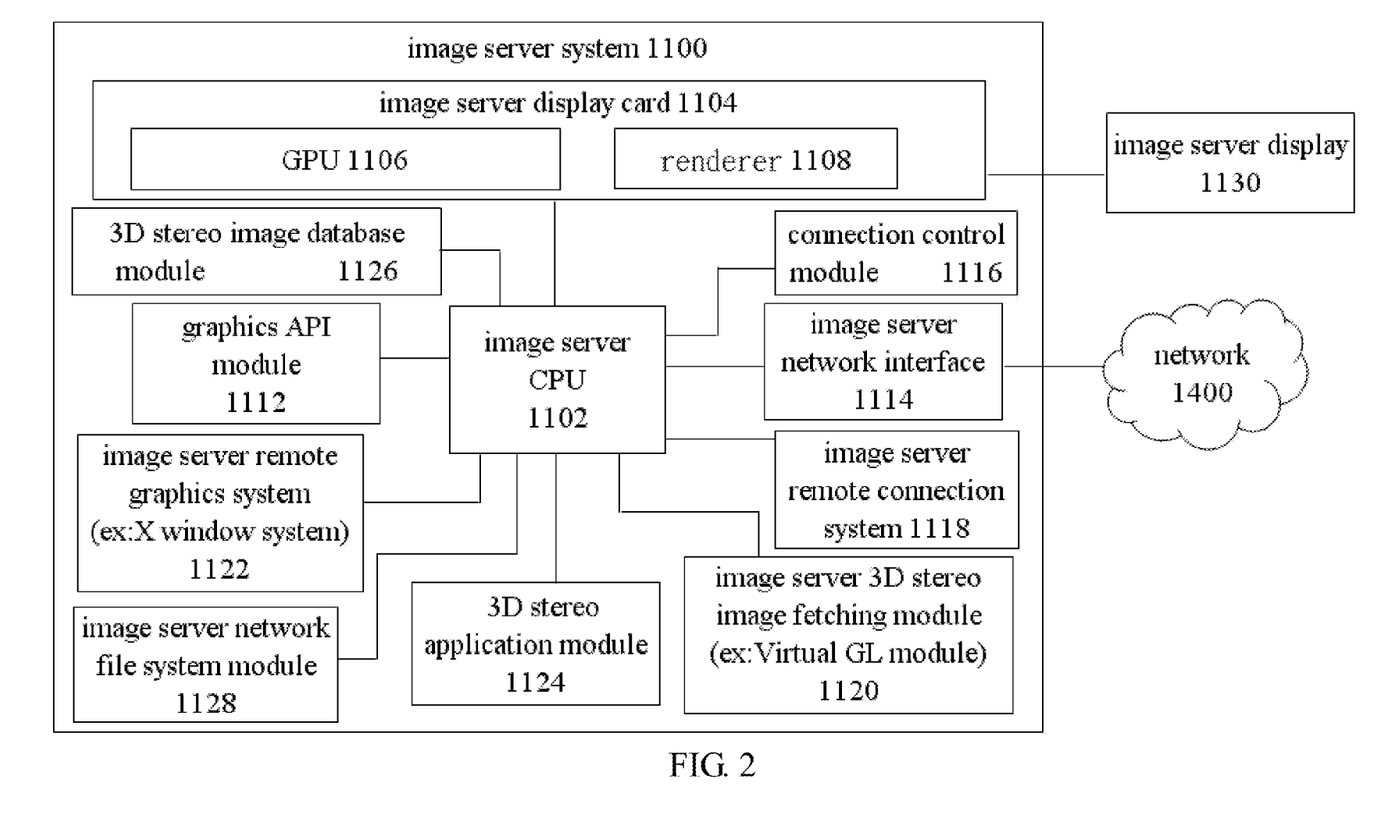
FIG. 2 illustrates the image server system 1100 according to the embodiments of the present invention.

In some embodiments of the present invention, the image server system 1100 is utilized to provide 3D stereo image data to the client system 1300. FIG. 2 shows an exemplary illustration. The image server system 1100 may comprise an image server processing unit 1102. The image server system 1100 may also comprise an image server display card 1104 (or referred as graphics card, video card, graphics accelerator card, or others, which referring to any apparatus for display), which comprising a graphics processing unit (GPU) 1106 and a renderer 1108. The image server system 1100 may also comprise a 3D stereo application 1124 and a graphics application programming interface (graphics API) module 1112 for execution. For example, the graphics API module 1112 may be implemented with OpenGL or DirectX.

The 3D stereo application module 1124 may comprise or couple to a plurality of buffers, for storing information of multiple-viewpoint images. The renderer 1108 is utilized to render the graphic outputs provided by the 3D stereo application module 1124. Alternatively, the image server system 1100 may comprise an image server display 1130, for display the graphic output. The image server system 1100 may also comprise an image server network interface 1114, for sending/receiving the commands/requests or data to the intermediate server system 1200 and the client system 1300. In the preferred embodiments, the image server system 1100 may comprise a connection control module 1116, for controlling the login and the commands/requests.

The image server system 1100 may comprise an image server remote connection system 1118, for the user to login. For example, the image server remote connection system 1118 may be implemented by a telnet system or a secure shell (SSH) system. The image server system 1100 may also comprise an image server 3D stereo image fetching module 1120 and an image server remote graphics system 1122. For example, the image server 3D stereo image fetching module 1120 may be implemented with Virtual GL, for fetching, encoding/compressing and packetizing the multiple viewpoints of image into a single packet and sending the single packet to the client system 1300, for amending the problem of nonsynchronicity existed in sending multiple viewpoints of image.

An image division module (it may be, but not limited to, implemented by the image server 3D stereo image fetching module 1120) may be utilized to divide an image into two or more segments, to facilitate encoding/compressing and packetizing separately, to send to the client system 1300, and display on single or multiple synchronized 3D stereo image display 1322. In the preferred embodiments, only the varied segment (variation portion, at least one pixel) of the image is fetched, encoded/compressed, and packetized, for reducing the volume of data required to be sent. For example, the image server remote graphics system 1122 may be implemented with the X window system, for receiving the interaction command from the client system 1300, sending the interaction command to the 3D stereo application module 1124, and sending the user interface (UI) request to the client system 1300.

The 3D stereo application module 1124 may be implemented with any application with 3D stereo output images. The image server system 1100 may further comprise a 3D stereo image database module 1126, for storing various 3D stereo images. The image server system 1100 may further comprise an image server network file system module 1128 to connect the intermediate server system 1200 through a network file system (NFS) or a network neighborhood system. The above-mentioned modules or components may be coupled to the image server CPU 1102 and other corresponding module or component, as shown in FIG. 2.

Figure 3:
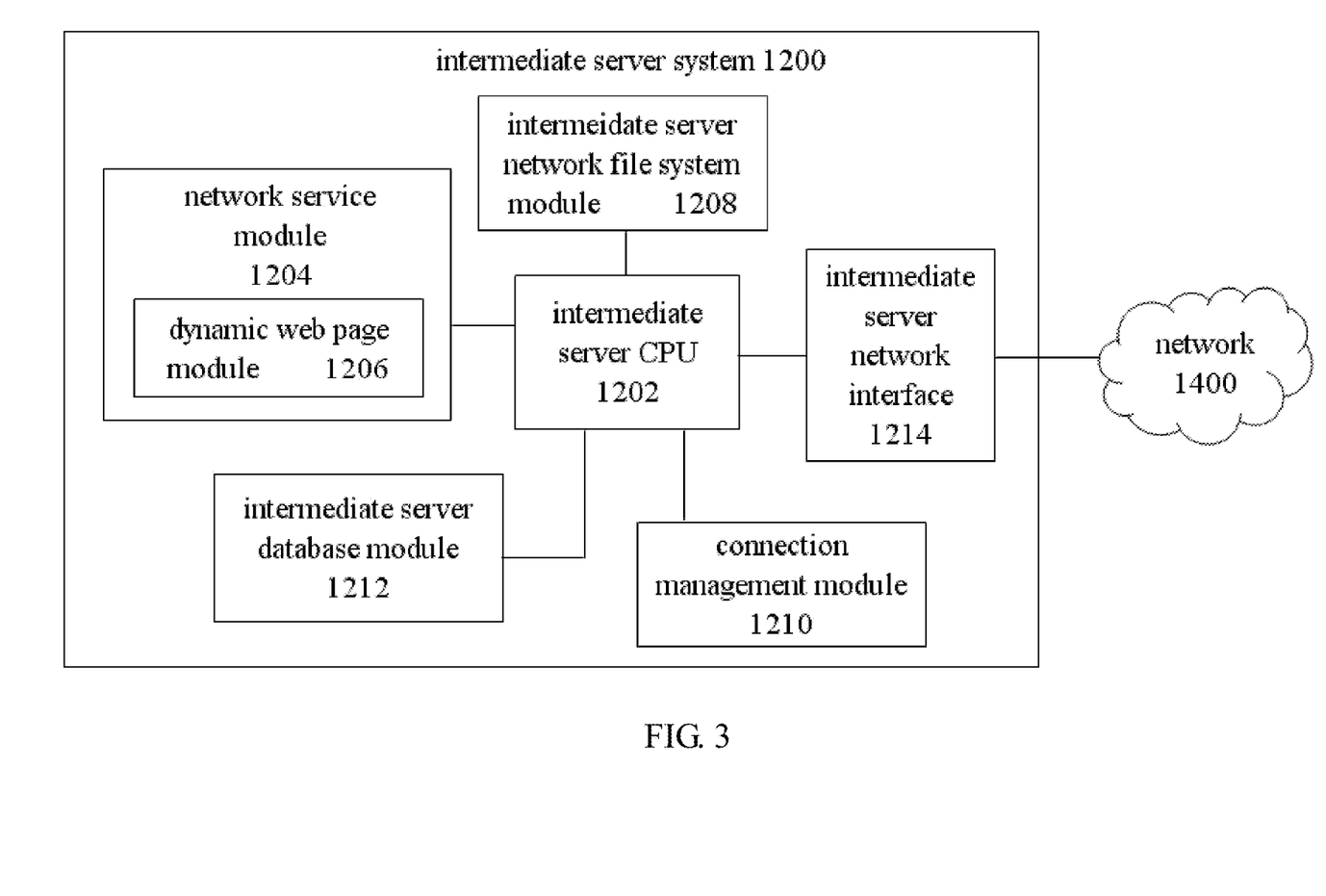
FIG. 3 illustrates the intermediate server system 1200 according to the embodiments of the present invention.

In some embodiments of the present invention, the intermediate server system 1200 is utilized as an intermediate apparatus between the image server system 1100 and the client system 1300, for preventing the client system 1300 directly accessing the data in the image server system 1100 and thus increasing the data security. In an exemplary embodiment, as shown in FIG. 3, the intermediate server system 1200 may comprise an intermediate server CPU 1202. The intermediate server system 1200 may also comprise a network service module 1204 which may comprise a dynamic web page module 1206. The network service module 1204 may provide a web server, for providing a web page on the internet for the client system 1300.

For example, the web page may provide the content list of the 3D stereo images and the summary of the contents provided by the image server system 1100, for the client system 1300 to comprehend. The dynamic web page module 1206 may utilize the hypertext preprocessor script (PHP script), the javaserver page script (JSP script), and/or the application service provider script (ASP script), for receiving the request from the client system 1300 and finding the suitable image server system 1100. The intermediate server system 1200 may further comprise an intermediate server network file system module 1208, for connecting the image server system 1100 via the image server network file system module 1128. The intermediate server system 1200 may also comprise a connection management module 1210, for distributing the most suitable image server system 1100 for the request(s) from the one or more client system 1300.

The intermediate server system 1200 may also comprise an intermediate server database module 1212, for storing various data, such as the accounts, the passwords, the IP addresses, the nicknames or others, related to the image server system 1100 and/or the client system 1300. The intermediate system 1200 may also comprise an intermediate server network interface 1214, for connecting to the network 1400.

Figure 4:
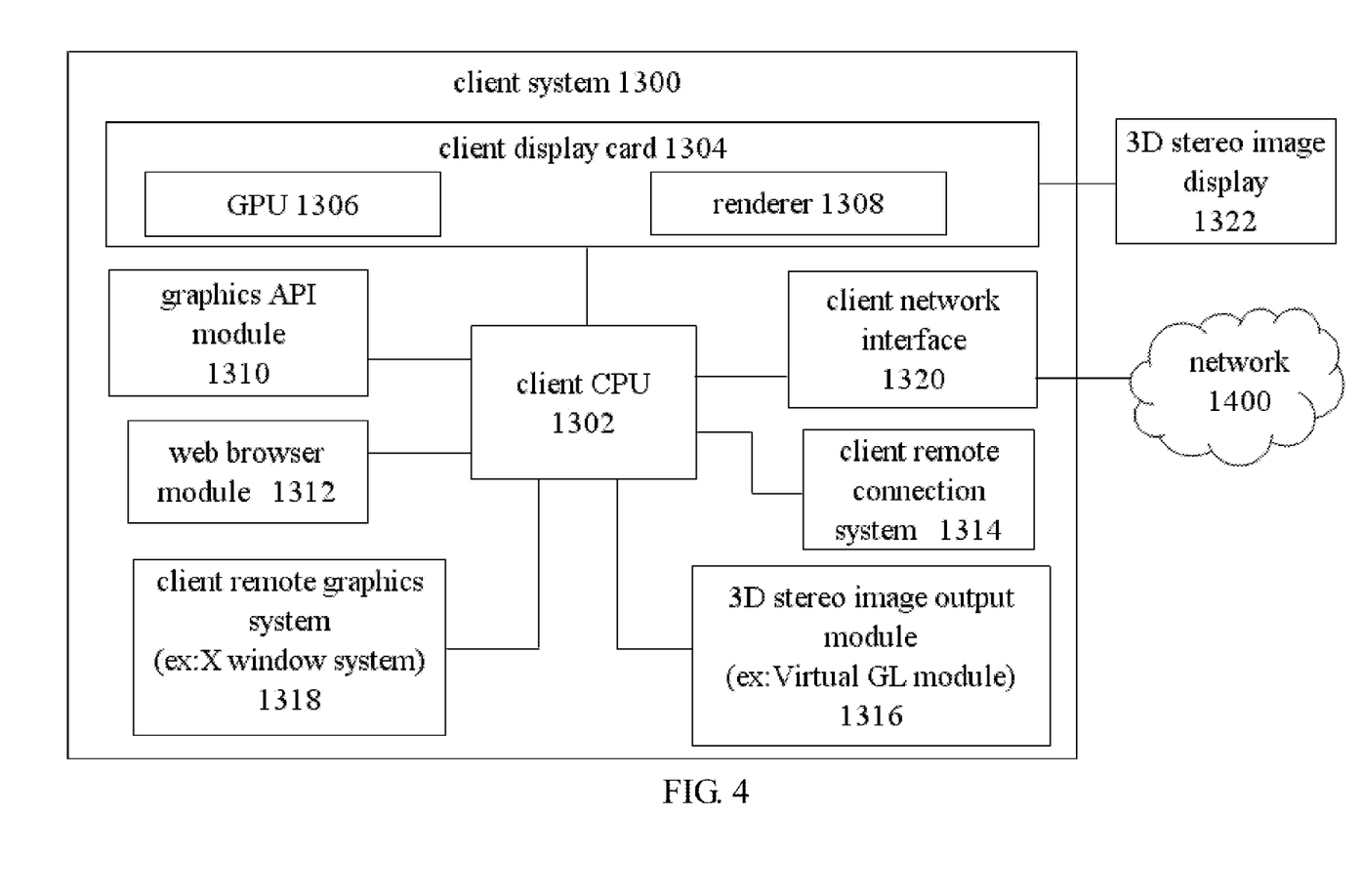
FIG. 4 illustrates the client system 1300 according to the embodiments of the present invention.

In some embodiments of the present invention, a client system 1300 is provided, as shown in FIG. 4. The client system 1300 may comprise a client CPU 1302, a client display card 1304, a GPU 1306, a renderer 1308, a graphics API module 1310, a client remote connection system 1314, a 3D stereo image output module 1316, a client remote graphics system 1318, and the client network interface 1320. The 3D stereo image output module may be implemented with Virtual GL, for receiving the packets comprising the multiple-viewpoint image. After procedures of packet reassembling and decoding/decompressing, the multiple-viewpoint image may be sent to the 3D stereo image display 1322. The other modules/components are substantially corresponding to or similar to those in the image server system 1100, therefore without further descriptions. The client system 1300 may further comprise a web browser module 1312, a 3D stereo image display 1322 etc. to browse the web page provided by the intermediate server system 1200, store the data provided by the intermediate server system 1200/the image server system 1100 and display the 3D stereo images.

Figure 5:
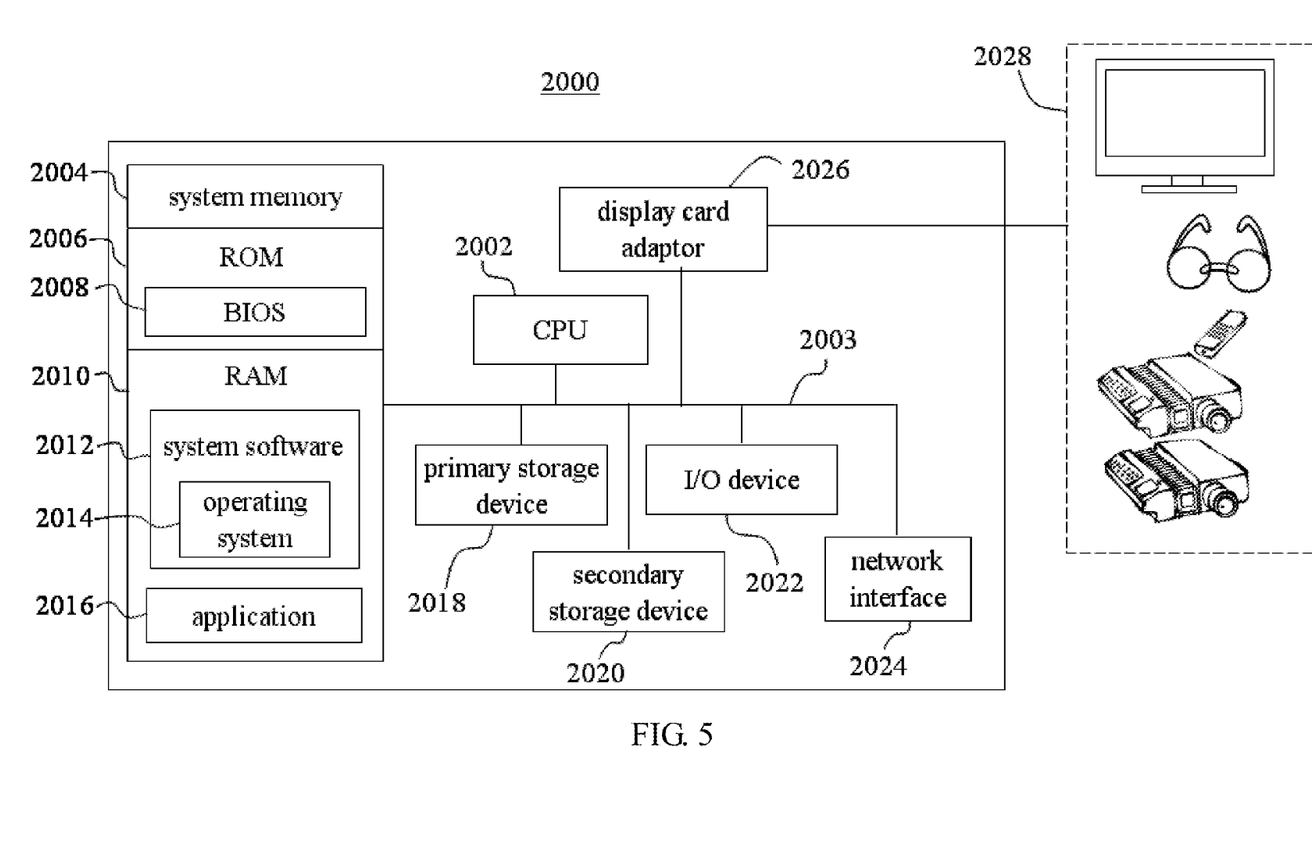
FIG. 5 illustrates the exemplary hardware 2000 according to the embodiments of the present invention.

For implementing the image server system 1100, the intermediate server system 1200, and the client system 1300, FIG. 5 shows an exemplary hardware according to the embodiments of the present invention. Hardware 2000 may comprise at least one CPU 2002, coupled, via a bus 2003, to memory components, input/output (I/O) device 2022, network interface 2024, display card adaptor 2026, 3D stereo image display 2028 and/or other devices/components. Furthermore, the memory components may comprise system memory 2004, read only memory (ROM) 2006, and random access memory (RAM) 2010. The ROM 2006 may load basic input and output system (BIOS) 2008. The RAM 2010 may load system software 2010, for executing the required instructions or data. More specifically, the system software may comprise operating system (OS) 2014. The RAM 2010 may store the required instructions and/or data for the CPU 2002 to execute.

The memory components may further comprise the primary storage device 2018 and the secondary storage device 2020. The OS 2014 and the application 2016 may also be stored in the primary storage device 2018 and the secondary storage device 2020. The memory components may comprise cache memory, for reducing the access times (access frequency) of the CPU 2002. The cache memory may comprise, but not limited to, static random access memory (SRAM). The primary storage device 2018 and the secondary storage device 2020 may comprise hard disk drive and/or optic disk drive, for providing storage medium to store computer executable instructions for the CPU 2002 to execute the various procedures according to the embodiments of the present invention. The 3D stereo image display 2028 may comprise various active, passive, anaglyph, and/or integral photography modes 3D stereo image display devices. Dual projecting devices and/or stereo glasses (such as shutter or polarization types) may be required for specific mode.

Another aspect of the present invention is to provide a method for providing 3D stereo image, for providing at least one intermediate server system 1200 between several image server systems 1100 and several client systems 1300. The client system 1300 may acquire the 3D stereo image only if the client system 1300 can acquire the key from the intermediate server system 1200, for providing an improved data security. Further, upon the managements of the intermediate server system 1200, one of the multiple image server systems 1100 may be chosen to provide service. The services for the multiple client systems 1300 may not concentrate on a specific image server system 1100, and thus a bad quality caused by overloading may be prevented. When some of the image server systems 1100 are out of control, the other image server systems 1100 can handle the requests from the clients instantly.

Figure 6:
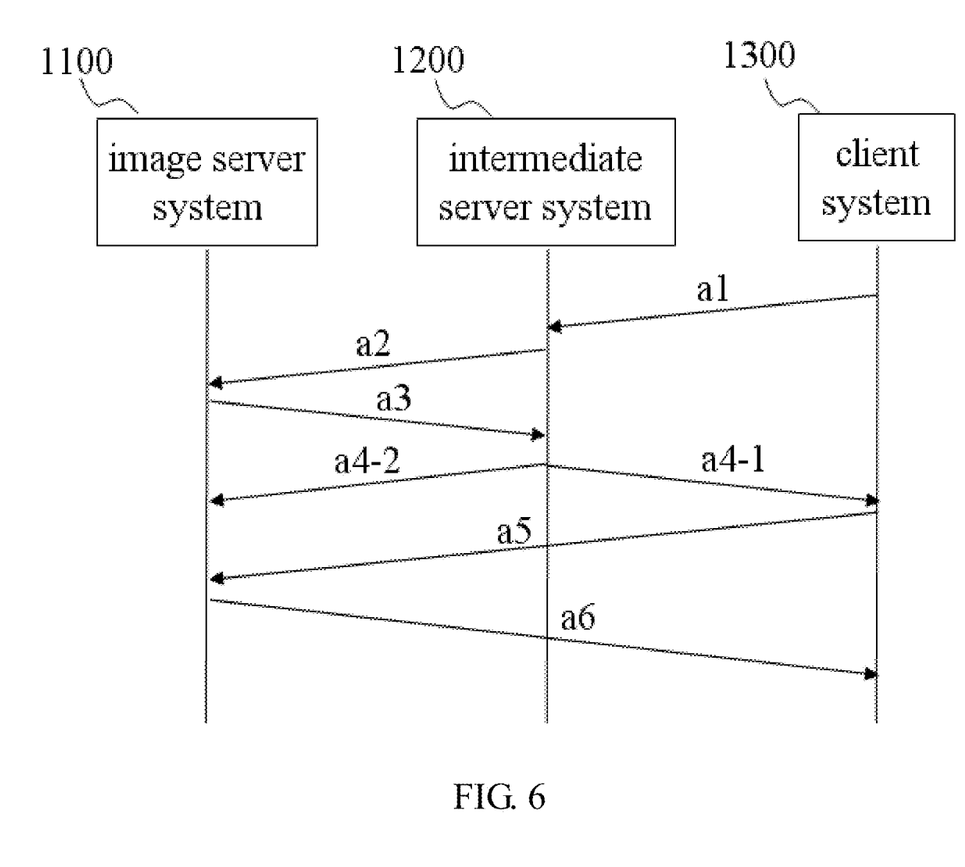
FIG. 6 illustrates a multiple handshaking mechanism for security according to the embodiments of the present invention.

For achieving the above purpose, a multiple handshaking mechanism is provided according to the embodiments of the present invention, as shown in FIG. 6. The client system 1300 utilizes the web browser module 1312 to send request a1 to the intermediate server system 1200 via hypertext transfer protocol (HTTP). The intermediate server system 1200 utilizes the network service module 1204 to receive the request a1 and utilizes the dynamic web page module 1206 to send a check command a2 to the image server system 1100 via the NFS or the neighborhood system. The image server system 1100 utilizes the connection control module 1116 to answer a response a3 to the intermediate server system 1200.

The intermediate server system 1200 acquires the status of the image server system 1100 based on the response a3, utilizes the connection management module 1210 to select a specific image server system 1100 (for example, the image server system 1100 with lower loading), and sends first distribution command a4-1 and second distribution command a4-2 to the client system 1300 and the image server system 1100, respectively. The first distribution command a4-1 notifies the client system 1300 of, for example, the key, the IP address, the nickname, the port number and/or other information of the selected image server system 1100. The second distribution command a4-2 notifies the selected image server system 1100 of, for example, the key information. Consequently, the client system 1300 may utilize the client remote connection system 1314 to send an image request a5 to the image server system 1100 according to the first distribution command a4-1 (such as the key information).

The image server system 1100 may utilize the image server remote connection system 1118 to receive the image request a5 and utilize the connection control module 1116 to check the image request a5. If the check procedure is passed, the image server system 1100 may utilize the image server 3D stereo image fetching module 1120, the image server mote graphics system 1122, and the 3D stereo application module 1124 to send the data a6 comprising the specified image and the related UI to the client system 1300.

Figure 7:
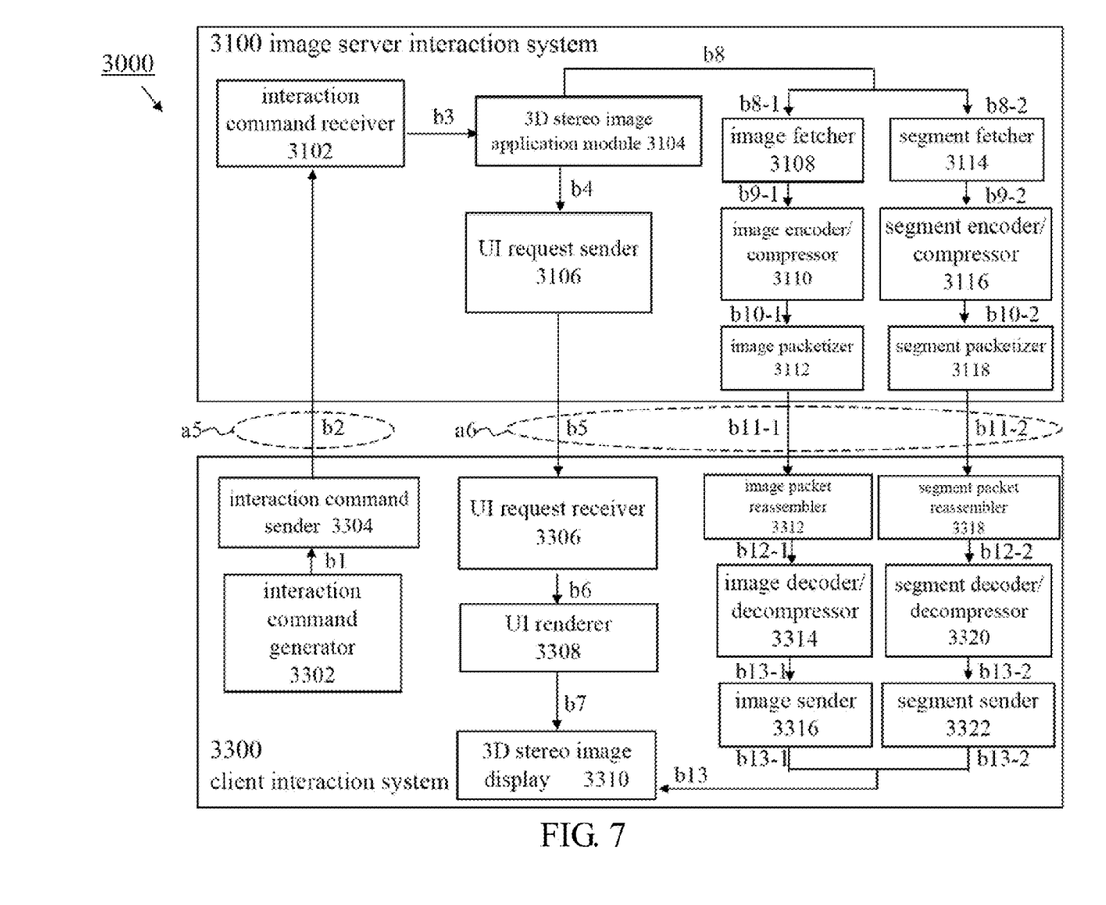
FIG. 7 illustrates the detailed multiple handshaking mechanism for interaction according to the embodiments of the present invention.

FIG. 7 further illustrates the mechanism of sending the UI and 3D stereo image according to the embodiments of the present invention, which substantially corresponding to the image request a5 and data a6. In FIG. 7, an interaction system 3000 is provided. The interaction system 3000 comprises an image server interaction system 3100 and a client interaction system 3300. The image server interaction system is provided by the image server system 3300, while the client interaction system 3300 is provided by the client system 1300.

In some embodiments of the present invention, the image server interaction system 3100 comprises an interaction command receiver 3102; a 3D stereo image application module 3104, coupled to the interaction command receiver 3102; a UI request sender 3106, coupled to the 3D stereo image application module 3104; an image fetcher 3108, coupled to the 3D stereo image application module 3104; an image encoder/compressor 3110, coupled to the image fetcher 3108; an image packetizer 3112, coupled to the image encoder/compressor 3110; a segment fetcher 3114, coupled to the 3D stereo image application module 3104; a segment encoder/compressor 3116, coupled to the segment fetcher 3114; a segment packetizer 3118, coupled to the segment encoder/compressor 3116.

The client interaction system 3300 comprises an interaction command generator 3302; an interaction command sender 3304, coupled to the interaction command generator 3302, for sending commands to the interaction command receiver 3102 via the network; a UI request receiver 3306, for receiving the commands from the UI request sender 3106 of the image server interaction system 3100; a UI renderer 3308, coupled to the UI request receiver 3306; an image packet reassembler 3312, for receiving data from the image packetizer 3112 of the image server interaction system 3100; an image decoder/decompressor 3314, coupled to the image packet reassembler 3312; an image sender 3316, coupled to the image decoder/decompressor 3314; a segment packet reassembler 3318, for receiving data from the segment packetizer 3118 of the image server interaction system 3100; a segment decoder/decompressor 3320, coupled to the segment packet reassembler 3318; a segment sender 3322, coupled to the segment decoder/decompressor 3320; and at least one 3D stereo image display 3310, coupled to the UI renderer 3308, the image sender 3316, and the segment sender 3322. In preferred embodiments, a plurality of 3D stereo image display 3310 may be utilized to provide a television wall display mode. The 3D stereo image display 3310 may comprise the 3D stereo interface devices (such as the display card and the connection ports), for connecting displays.

As shown in FIG. 7, the client interaction system 3300 utilizes the interaction command generator 3302 (such as keyboard, mouse, joystick, microphone, touch panel, or others) to generate an interaction command b1 and send it to the interaction command sender 3304. The interaction command sender 3304 may comprise an encoder/compressor and a packetizer, for generating an encoded/compressed and packetized interaction command packet b2 and sending it to the interaction command receiver 3102 of the image server interaction system 3100.

The interaction command receiver 3102 may comprise a decoder/decompressor and a packet reassembler, for receiving the packet b2, generating a reassembled packet and decoded/decompressed interaction command b3, and send the interaction command b3 to the 3D stereo image application module 3104. For example, under the X window environment, the socket in TCP/IP may be utilized to send the data to the OS (such as the Linux OS) for packetizing and sending. Consequently, the 3D stereo image application module 3104 provides a UI request b4 to the UI request sender 3106. The UI request sender 3106 may comprise an encoder and a transmitter, for generating an encoded UI request b5 according to the UI request b4 and sending the encoded UI request b5 to the UI request receiver 3306 of the client interaction system 3300. The UI request receiver 3306 may comprise a receiver and a decoder, for receiving the encoded UI request b5, generating a decoded UI request b6, and sending the decoded UI request b6 to the UI renderer 3308. UI renderer 3308 renders a UI information b7 according to the decoded UI request b6 and provides the UI information b7 to the 3D stereo image display 3310 for displaying.

When receiving the command b3, the 3D stereo image application module 3104 proceeds with the computation assigned by the client system 1300 according to the command b3. The graphics API module 1112 stores the 3D stereo image (multiple-viewpoint image) generated from the computation into a plurality of buffers respectively to be fetched by the image fetcher 3108. The 3D stereo image application module 3104 also generates the UI request, b4, to the UI request sender 3106. The UI request, b4, comprises required information for update. For example, when the size of the viewing window is changed, the UI request, b4, may comprise the length and width information of the viewing window and the related coordinates therein. For example, when some checkbox is clicked, the UI request, b4, may comprise the information related to the clicked checkbox. In some embodiments, the X window system is utilized, and the UI request, b4, may be implemented by X window request.

In another aspect, the 3D stereo image application module 3104 may generate an image data b8-1 according to the interaction command b3. The image fetcher 3108 may fetch the image data b8-1, generate a fetched image data b9-1, and provide the fetched image data b9-1 to the image encoder/compressor 3110. The image encoder/compressor 3110 may encode/compress the fetched image data b9-1, generate an encoded/compressed image data b10-1, and provide the encoded/compressed image data b10-1 to the image packetizer 3112. The image packetizer 3112 may packetize the encoded/compressed image data b10-1, generate a packetized image data b11-1, and provide the packetized image data b11-1 to the image packet reassembler 3312 of the client interaction system 3300 via the network. The image packet reassembler 3312 may reassemble the packetized image data b11-1, generate a reassembled image data packet b12-1, and provide the reassembled image packet data b12-1 to the image decoder/decompressor 3314.

The image decoder/decompressor 3314 may decode/decompress the reassembled image data packet b12-1, generate a decoded/decompressed image data b13-1, and send the decoded/decompressed image data b13-1 to the 3D stereo image display 3310 through the image sender 3316. Consequently, one advantage of the present invention is to provide a method for providing 3D stereo image. The method may apply procedures of fetching, encoding/compressing, and packetizing to the multiple viewpoints in at the image server interaction system 3100, for generating a single packet.

The method may also apply procedures of reassembling packet, decoding/decompressing to transform the single packet to the original multiple viewpoints. Thus, the non-synchronicity problem of image caused by narrow network bandwidth or other factors may be improved. Further, because all of the image data transferred to the client system(s) are the plotted images provided by the 3D stereo image application module 3104 but not original 3D image data, it may improve the security problem of data leakage. For the display of the 3D stereo image, commercial display cards which provide 3D stereo image displaying functionality, such as Nvidia Quardro display cards, may be applied. For the 3D stereo image application module 3104, it may apply, but not limited to, commercial software product, such as Avizo software (product of Visualization Science Group), or other software modified upon the existed software.

Furthermore, in the preferred embodiments, it may only apply the procedures of fetching, encoding/compressing, and packetizing to the variation segment, such as the variation portion among any two frames in a video stream, for reducing the data required to be transferred. For example, in some embodiments, the segment fetcher 3114 may comprise at least one temporary history module. The temporary history module may compare the variation among the different images in a video stream. In preferred embodiments, the segment fetcher 3114 may fetch only the variation segment (variation portion) after comparing the images. The segment fetcher 3114 may provide the variation segment together with the required information, such as the coordinates of the varied pixels, to the segment encoder/compressor 3116. The segment sender 3322 may update the segment displayed on the 3D stereo image display 3310 according to the segment data b13-2. Some other procedures are similar to the procedures mentioned above, and they are neglected for brevity.

Figure 8:
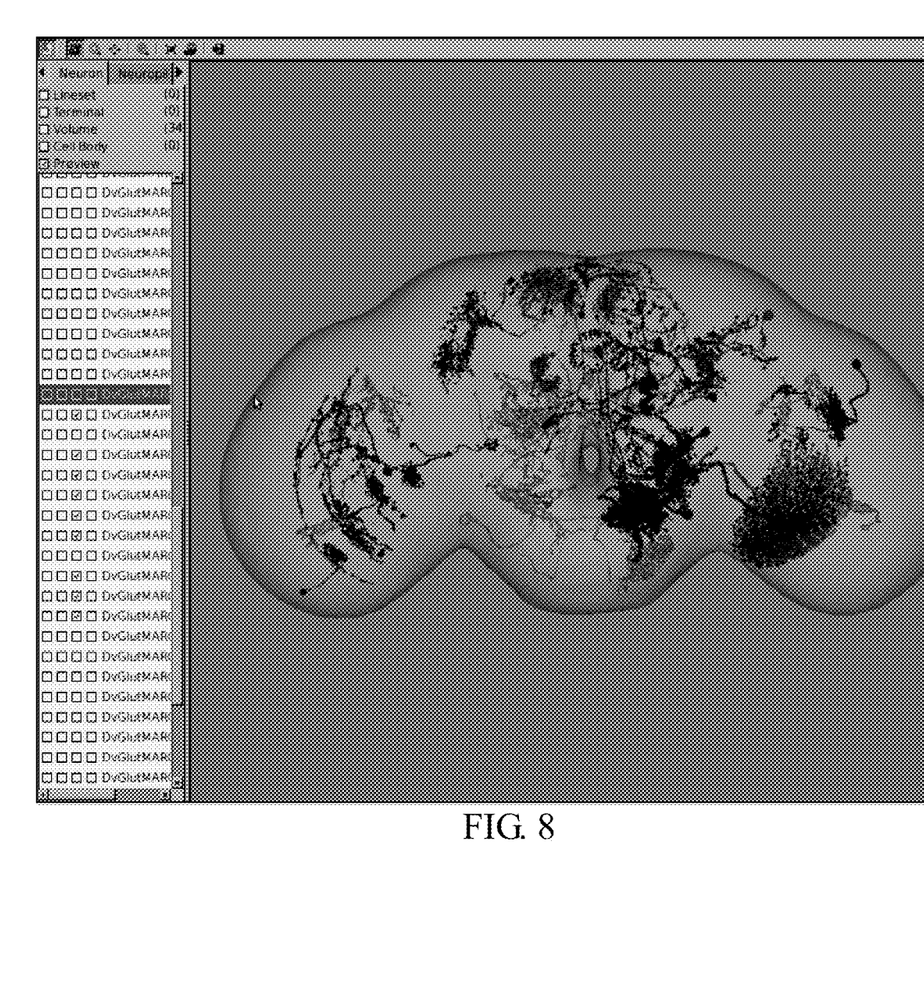
FIG. 8 illustrates one specific embodiment of the present invention.

In some specific embodiments, the system and the method for providing 3D stereo image may provide 3D stereo image of the *Drosophila melanogaster* (or fruit fly) brain and its internal nerve structures with an interactive user interface, as shown in FIG. 8. The features of the present invention may be better observed in FIG. 8. Upon the assignment of the user, the image server interaction system 3100 may alternatively provide or not provide the images of, such as, neuron and/or neuropil. The different classes of images may be shown with different colors to provide better identification. The user may utilize the mouse or other devices to submit an interaction request to ask for a rotation of the *Drosophila melanogaster* brain image along the various rotation axes. The brain image may also be zoomed in for an amplified detail.

In the preferred embodiments, a mobile system and the method thereof are provided, for lowering the difficulty of constructing the environment of a client system 1300. The user may utilize a USB storage device or mobile hard disk drive, a CD/DVD/Blue-Ray disk or other devices, which store a computer program product for constructing an environment for the client system, to boot a computer. When the network configuration is completed by the dynamic host configuration protocol (DHCP) server automatically or by manual configuring, the user may use the web browser to connect to the server (the image server system 1100 and/or the intermediate server system 1200, as mentioned above) to ask for 3D stereo images.

For the user, the required procedure may substantially be the network configuration. For example, the mobile system may be implemented by a computer software product which is stored in a computer readable medium. In the preferred embodiments, the computer readable medium may be USB storage device. The mobile system may comprise OS, network module, web browser module, plug-in module, driver for hardware (such as display card), key for network, etc. For example, the mobile system may provide an OS, such as the Linux OS, and the related drivers. The mobile system may utilize the Firefox web browser and the related program instead of using the original programs installed in this computer. In some embodiments, when the user plug the storage medium into the computer, the environment for the client system 1300 may be setting up instantly for the user to use. For example, the mobile system may be implemented as a Linux live system, such as the Ubuntu live system or the Knoppix Linux system. The technical details may refer to "Live USB", "Live CD", "List of Live CDs", and "Knoppix Linux" in WIKIPEDIA. "Knoppix hacks: 100 industrial-strength tips & tools, OREILLY, 2005" may also be a reference. It is intended to incorporate these references into the embodiments.

Figure 9:
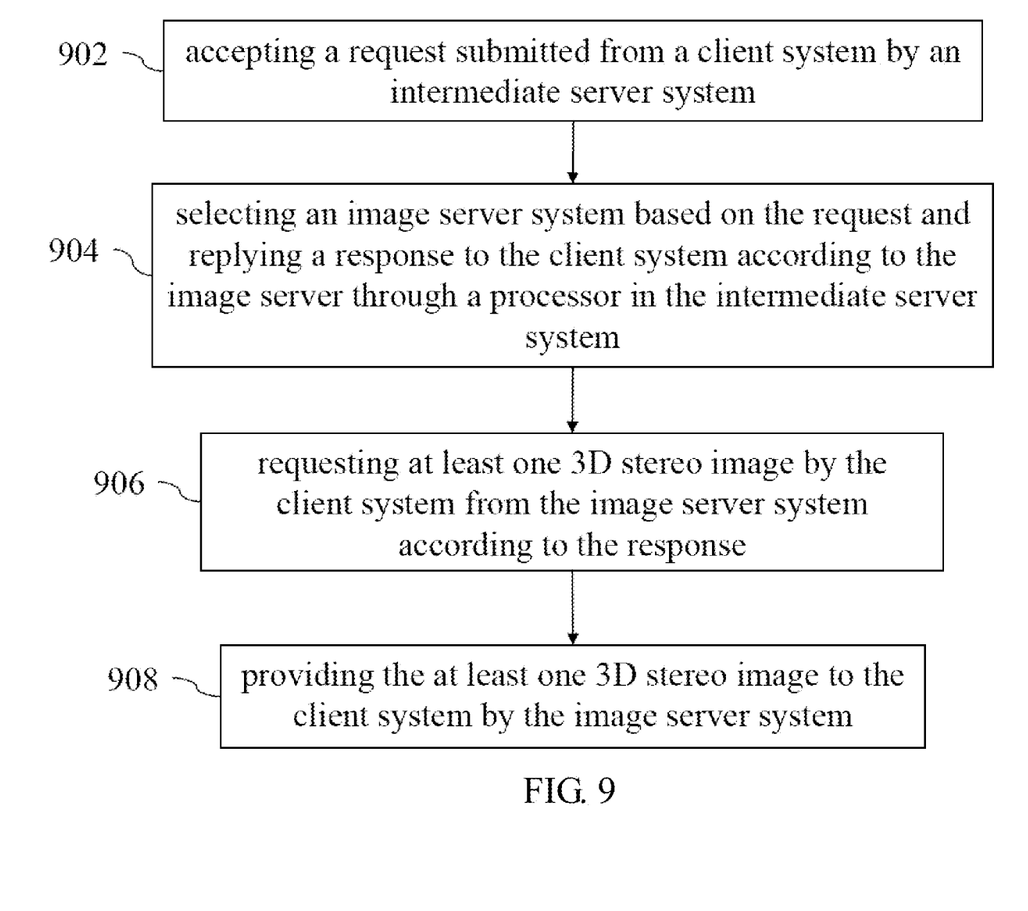
FIG. 9 illustrates the procedures of the method for providing 3D stereo image according to the embodiments of the present invention.

FIG. 9 shows the procedures of the method for providing 3D stereo image. The method comprises: at step 902, accepting a request submitted from a client system 1300 by an intermediate server system 1200; at step 904, selecting an image server system 1100 based on the request and responding to the client system 1300 regarding the image server 1100 through a processor in the intermediate server system 1200; at step 906, requesting at least one 3D stereo image by the client system 1300 from the image server system 1100 according to the response; and at step 908, providing the at least one 3D stereo image to the client system 1300 by the image server system 1100.

Figure 10:
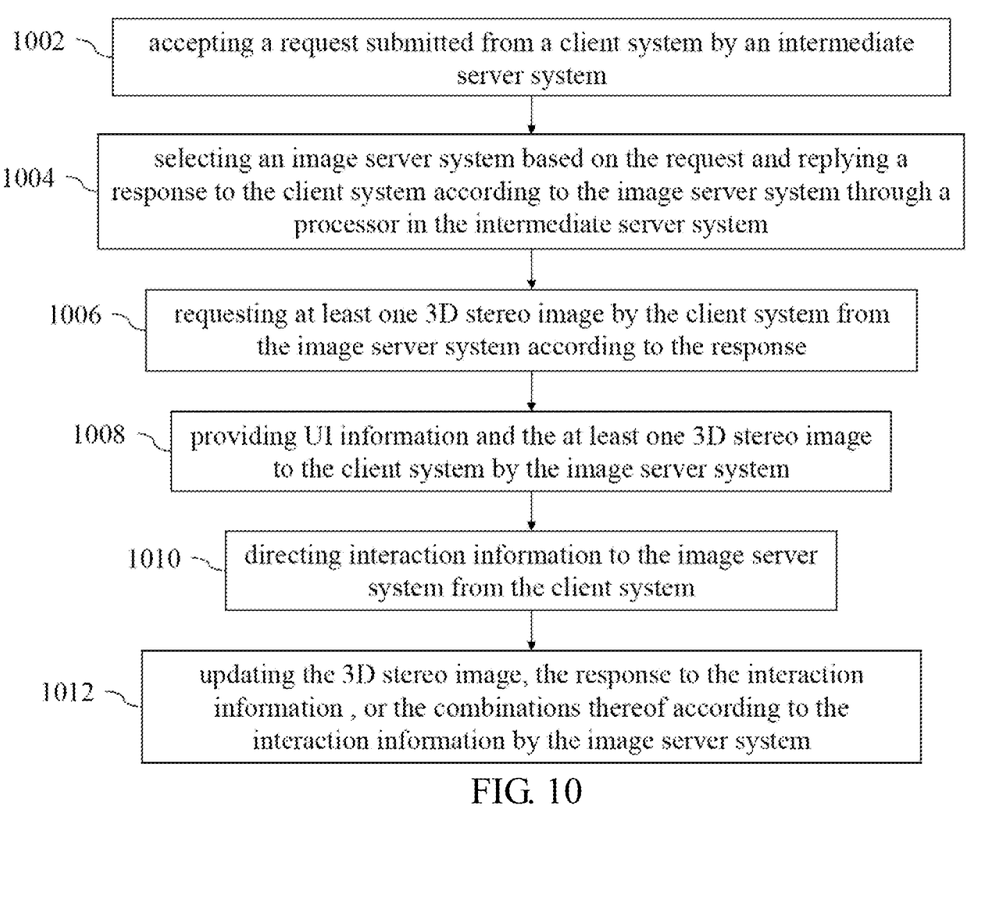
FIG. 10 illustrates some other procedures of the method for providing 3D stereo image according to the embodiments of the present invention.

FIG. 10 shows the procedures of the method for providing 3D stereo image according to other embodiments of the present invention. The method comprises: at step 1002, accepting a request submitted from a client system 1300 by an intermediate server system 1200; at step 1004, selecting an image server system 1100 based on the request and responding to the client system 1300 regarding the image server system 1100 through a processor in the intermediate server system 1200; at step 1006, requesting at least one 3D stereo image by the client system 1300 from the image server system 1100 according to the response; at step 1008, providing UI information and the at least one 3D stereo image to the client system 1300 by the image server system 1100; at step 1010, directing interaction information (such as commands of rotating, zooming in/out, moving, adding/deleting items of the 3D stereo image) to the image server system 1100 from the client system 1300; and at step 1012, updating the 3D stereo image, in response to the interaction information (such as responses to commands of rotating, zooming in/out, moving, adding/deleting items of the 3D stereo image), or the combinations thereof according to the interaction information by the image server system 1100.

In some embodiments of the present invention, the method for providing 3D stereo image may be implemented by a computer readable storage medium which comprises computer executable instructions. When an apparatus, such as a programmable processor, reads the instructions, the method may be implemented.

In some embodiments of the present invention, the method for providing 3D stereo image may be implemented by a computer software product which is stored on a computer readable storage medium. When an apparatus, such as a programmable processor, reads the instructions of the computer software product, the method may be implemented.

The above descriptions are the preferred embodiments of the present invention. They are intended to explain the present invention but not to limit the range of the present invention. For brevity, some well known components of steps may not be illustrated. The range of the present invention should base upon the claims and their equivalences.

What is claimed is:

1. A method for providing three-dimensional stereo image of neurons or neuropils, the method comprising:
   accepting a request submitted from a client system for acquiring images by an intermediate server system with no image file upload allowance;
   utilizing a connection management module to select the most suitable image server system for load balancing from a plurality of image server systems by said intermediate server system based on said request and utilizing a connection control module to answer a response from the image server system to said intermediate server system without capability to change stored image files;
   sending a first distribution command comprising a key information from said intermediate server system to the client system and the image server system;
   sending a second distribution command from said intermediate server system to the image server system;
   preventing said client system from directly accessing image files in said image server system with said intermediate server system by transmitting only plotted images from said image server system to said client system to improve security problem of data leakage;
   making an image request for at least one three-dimensional stereo image of the neurons or neuropils to said image server system through said intermediate server system by said client system according to said first distribution command comprising the key information;
   utilizing said connection control module to check said image request;
   utilizing a 3D stereo image application module to generate a plotted image of said at least one three-dimensional stereo image of the neurons or neuropils according to an interaction command;
   dividing said plotted image of said at least one three-dimensional stereo image of the neurons or neuropils into a plurality of segmented images on said selected image server system;
   providing said plurality of segmented images of said plotted image of said at least one three-dimensional stereo image of the neurons or neuropils separately or together to said client system through said intermediate server system by said image server system, wherein said at least one segmented image is displayed in one or multiple synchronized three-dimensional stereo display by said client system, wherein different neurons or neuropils are shown in different colors in said at least one three-dimensional stereo image to identify different neurons or neuropils;
   providing a mobile storage medium which comprises an executable computer program product for constructing an environment of said client system so as to setup said client system to be compatible to said image server system and said intermediate server system on a network, wherein said mobile storage medium comprises a USB storage device, a mobile hard disk drive, a CD disk, a DVD disk or a Blue-Ray disk; and
   connecting said mobile storage medium to a computer and executing said computer program product on said computer to construct said environment of said client system on said computer.

2. The method according to claim 1, further comprising:
   fetching, by a fetcher, a plurality of viewpoints of entire or a segment of at least one image from a plurality of buffers;
   encoding, by a encoder, said entire or a segment of at least one image, for generating a plurality of viewpoints of entire or a segment of at least one encoded image; and
   packetizing, by a packetizer, said plurality of viewpoints of entire or a segment of at least one encoded image, into at least one packet for said plurality of viewpoints of entire or a segment of at least one encoded image.

3. The method according to claim 2, further comprising:
   packet reassembling, by a packet reassembler, said at least one packet for said plurality of viewpoints of entire or a segment of at least one encoded image, for acquiring said plurality of viewpoints of entire or a segment of at least one encoded image; and
   decoding, by a decoder, said plurality of viewpoints of entire or a segment of at least one encoded image, for acquiring said plurality of viewpoints of entire or a segment of at least one image.

4. The method according to claim 1, wherein at least one pixel is updated in a frame of said three-dimensional stereo image from the previous frame in a video stream.

5. The method according to claim 4, wherein said at least one pixel is fetched by at least one temporary history module.

6. The method according to claim 1, further comprising utilizing a three-dimensional stereo display to display said three-dimensional stereo image of the neurons or neuropils in active mode, passive mode, anaglyph mode, integral photography mode, or the combinations thereof.

7. The method according to claim 1, further comprising utilizing a plurality of three-dimensional display to display said three-dimensional stereo image of the neurons or neuropils with television wall display mode.

8. The method according to claim 1, further comprising utilizing a network service module in said intermediate system to provide a web server.

9. A method for providing three-dimensional stereo image of neurons or neuropils, the method comprising:
   providing a web page for a client system by an intermediate server system, said web page providing a list of at least one three-dimensional stereo image of the neurons or neuropils provided by a plurality of image server systems and a summary of said at least one three-dimensional stereo image of the neurons or neuropils;

accepting a request submitted from said client system by said intermediate server system with no image file upload allowance;
utilizing a connection management module to select the most suitable image server system for load balancing from a plurality of image server systems by said intermediate server system based on said request and utilizing a connection control module to answer a response from the image server system to said intermediate server system without capability to change stored image files;
sending a first distribution command comprising a key information from said intermediate server system to the client system and the image server system;
sending a second distribution command from said intermediate server system to the image server system;
preventing said client system from directly accessing image files in said image server system with said intermediate server system by transmitting only plotted images from said image server system to said client system to improve security problem of data leakage;
making an image request for said at least one three-dimensional stereo image of the neurons or neuropils to said image server system through said intermediate server system by said client system according to said first distribution command comprising the key information;
utilizing said connection control module to check said image request;
utilizing a 3D stereo image application module to generate a plotted image of said at least one three-dimensional stereo image of the neurons or neuropils according to an interaction command;
dividing said plotted image of said at least one three-dimensional stereo image of the neurons or neuropils into a plurality of segmented images on said selected image server system;
providing user interface information and said plurality of segmented images of said plotted image of said at least one three-dimensional stereo image of the neurons or neuropils separately or together to said client system through said intermediate server system by said image server system, wherein said at least one segmented image is displayed in one or multiple synchronized three-dimensional stereo display by said client system, wherein different neurons or neuropils are shown in different colors in said at least one three-dimensional stereo image to identify different neurons or neuropils;
transmitting interaction information to said image server system selected by said intermediate server system from said client system through said intermediate server system, wherein said interaction information comprises commands of adding/deleting items of said three-dimensional stereo image of the neurons or neuropils, comprising:
    utilizing an interaction command generator in said client system to generate said interaction command, and
    utilizing an interaction command sender to encode said interaction command, generate an encoded interaction command, and provide said encoded interaction command to an interaction command receiver in said image server system through said intermediate server system; and
utilizing said 3D stereo image application module to update said plotted image of said at least one three-dimensional stereo image of the neurons or neuropils according to said interaction information by said image server system selected by said intermediate server system, comprising:
    utilizing said interaction command receiver to decode said encoded interaction command and generate said interaction command,
    utilizing said 3D stereo image application module to generate a user interface request according to said interaction command,
    utilizing a user interface sender to encode said interface request, generate an encoded interface request, and send said encoded interface request to a user interface receiver in said client interaction system through said intermediate server system,
    utilizing said user interface receiver to decode said encoded interface request and generate said user interface request, and
    utilizing a user interface renderer to render a user interface according to said user interface request and send said user interface to at least one display.

10. The method according to claim 9, further comprising:
providing a mobile storage medium which comprises an executable computer program product for constructing an environment of said client system; and
connecting said mobile storage medium to a computer for constructing said environment for said client system on said computer by said computer program product.

11. The method according to claim 9, further comprising:
fetching, by a fetcher, a plurality of viewpoints of entire or a segment of at least one image from a plurality of buffers;
encoding, by a encoder, said entire or a segment of at least one image, for generating a plurality of viewpoints of entire or a segment of at least one encoded image; and
packetizing, by a packetizer, said plurality of viewpoints of entire or a segment of at least one encoded image, into at least one packet for said plurality of viewpoints of entire or a segment of at least one encoded image.

12. The method according to claim 11, further comprising:
packet reassembling, by a packet reassembler, said at least one packet for said plurality of viewpoints of entire or a segment of at least one encoded image, for acquiring said plurality of viewpoints of entire or a segment of at least one encoded image; and
decoding, by a decoder, said plurality of viewpoints of entire or a segment of at least one encoded image, for acquiring said plurality of viewpoints of entire or a segment of at least one image.

13. The method according to claim 9, wherein at least one pixel is updated in a frame of said three-dimensional stereo image of the neurons or neuropils in a video stream which is different from the previous frame.

14. The method according to claim 13, wherein said at least one pixel is fetched by at least one temporary history module.

15. The method according to claim 9, further comprising utilizing a three-dimensional stereo display to display said three-dimensional stereo image of the neurons or neuropils in active mode, passive mode, anaglyph mode, integral photography mode, or the combinations thereof.

16. The method according to claim 9, wherein said interaction information comprises commands of rotating, zooming in/out, moving of said three-dimensional stereo image of the neurons or neuropils.

17. The method according to claim 9, further comprising utilizing a plurality of three-dimensional display to display said three-dimensional stereo image of the neurons or neuropils with television wall display mode.

18. The method according to claim 9, further comprising utilizing a network service module in said intermediate system to provide a web server.

* * * * *